United States Patent [19]
Elliott et al.

[11] 3,715,460
[45] Feb. 6, 1973

[54] TUBULAR DEADEND SUPPORTS

[75] Inventors: Ernest A. Elliott, Detroit; Randolph A. Pasen, Dearborn Heights, both of Mich.

[73] Assignee: The Detroit Edison Company, Detroit, Mich.

[22] Filed: June 11, 1971

[21] Appl. No.: 152,113

[52] U.S. Cl..........174/158 R, 174/45 R, 174/149 R, 174/177
[51] Int. Cl......................H01b 17/14, H02g 7/20
[58] Field of Search.174/40 R, 43, 45 R, 148, 149 R, 174/158 R, 176, 177, 178, 179, 186, 194, DIG. 4; 52/40, 697, 721; 248/221

[56] References Cited

UNITED STATES PATENTS

| 398,489 | 2/1889 | Brady | 174/45 R UX |
|---|---|---|---|
| 1,303,324 | 5/1919 | Jackson | 174/186 X |
| 2,437,375 | 3/1948 | Buxton | 174/45 R |
| 2,997,529 | 8/1961 | Fink | 174/179 X |
| 3,342,925 | 9/1967 | Lewis et al | 174/45 R |
| 3,574,104 | 4/1971 | Medler | 174/45 R UX |

FOREIGN PATENTS OR APPLICATIONS

| 419,441 | 10/1925 | Germany | 174/45 R |
|---|---|---|---|
| 1,048,434 | 11/1966 | Great Britain | 174/194 |

*Primary Examiner*—Laramie E. Askin
*Attorney*—Whittemore, Hulbert & Belknap

[57] ABSTRACT

Tubular deadend supports are constructed from elongated tubular members, preferably formed of fiberglass reinforced plastic material provided adjacent their outer ends with metallic mounting members adapted to be engaged by line insulators. For heavy duty the mounting members are arranged to support the insulators extending at 90° to the tubular member. For light duty the mounting members provide for extension of the insulators beyond the end of the tubular members.

8 Claims, 12 Drawing Figures

PATENTED FEB 6 1973 3,715,460

INVENTORS
Ernest A. Elliott
Randolph A. Pasen
BY Whittemore
Hulbert & Belknap
ATTORNEYS

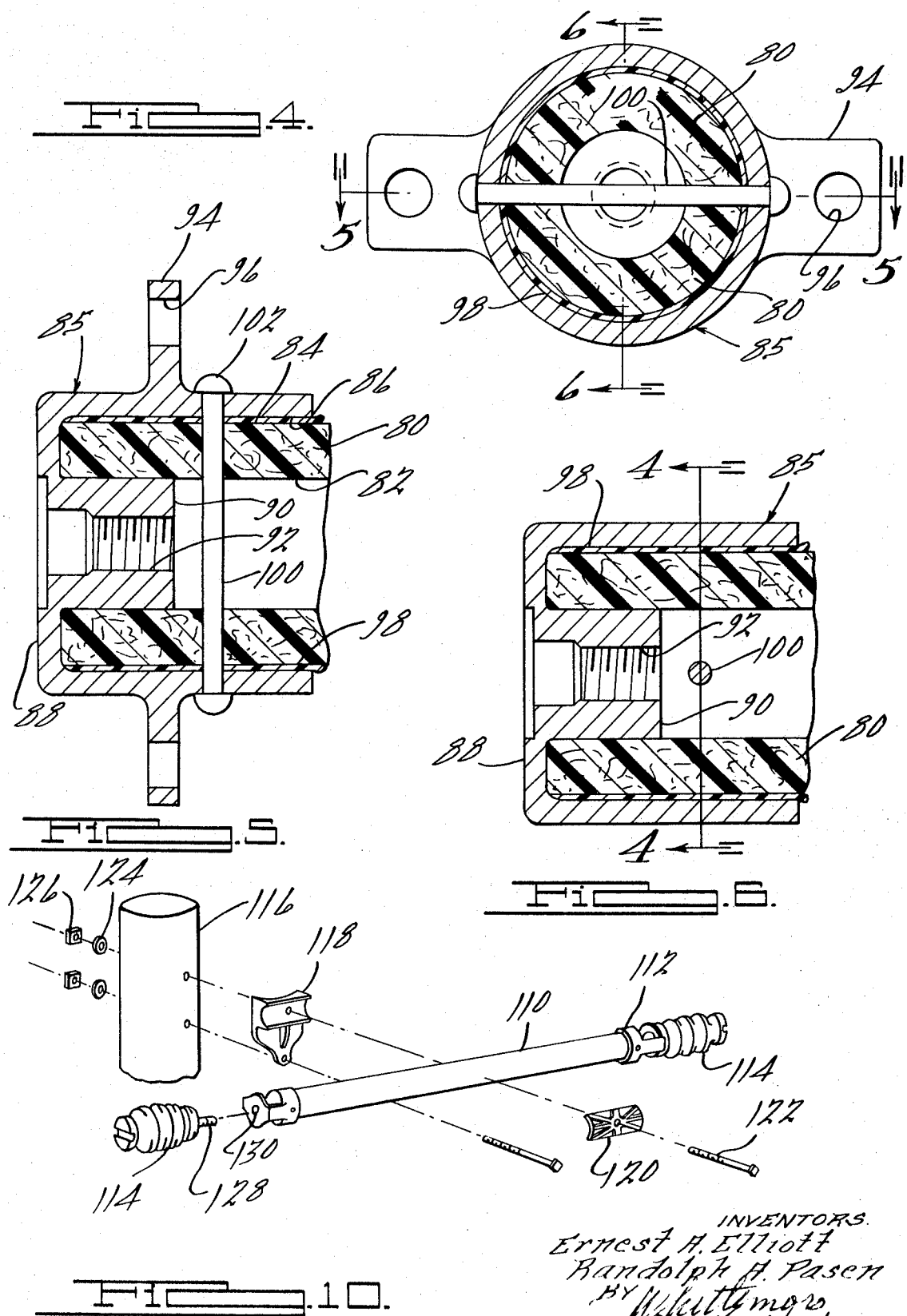

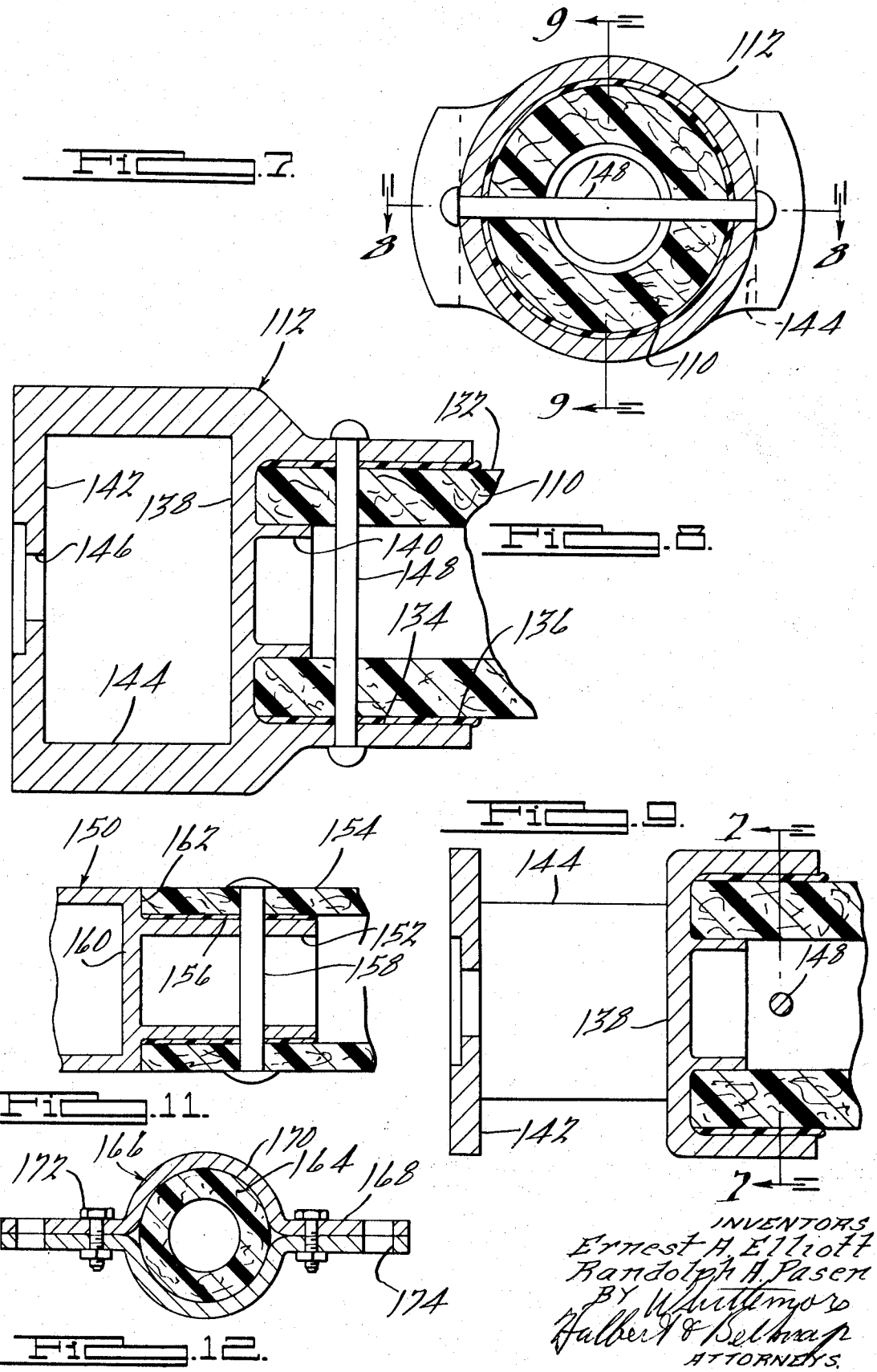

TUBULAR DEADEND SUPPORTS

CROSS-REFERENCE TO RELATED INVENTION

The present invention represents an improvement over deadend supports disclosed in U.S. Pat. No. 3,574,104.

BRIEF SUMMARY OF THE INVENTION

The present invention relates to deadend supports comprising elongated tubular members formed of relatively thick reinforced plastic such for example as a hardened resin containing glass fibers.

Deadend supports are provided in electrical transmission lines for mounting insulators in such a way that they can satisfactorily withstand relatively large unbalanced forces applied to the insulators as a result of tension in the transmission lines.

These deadend supports may actually constitute the termination of a transmission line or they may be employed where the direction of the transmission line makes a substantial change, as for example a 90° change, in which case, in effect the two sections of the transmission lines both "deadend" at the pole and are interconnected by jumper lines or taps but the strain on the insulators is taken up by the deadend support.

In general, the deadend support structure comprises a strong rigid tubular member formed of insulating material and insulator supports connected to the ends of the tube. The end portions of the tubes comprise internal and external cylindrical surfaces and in order to provide the maximum rigidity and strength of the deadend support structure, the insulator support includes an elongated portion having a cylindrical surface substantially interfitting with either the internal or external cylindrical surface of the tube. The actual connection between the tube end portions and the insulator support is preferably provided by a very strong plastic adhesive such for example as epoxy. Preferably, in addition to the adhesive bond established between the substantially interfitting cylindrical surfaces at the end portions of the tube and the insulator supports, there is provided a pin extending diametrically across the connection between the tube and supports, the pin extending horizontally.

Two types of insulator supports are provided. The first is a heavy duty construction in which the metallic insulator support is provided with one or more laterally extending ears to which a disc or strain insulator is attached.

In other cases, the insulator support is provided with means for mounting an elongated insulator to extend longitudinally of the tube beyond one end thereof. In some cases the metal insulator support may be provided with both the laterally extending ear and with the means for mounting the insulator to extend longitudinally beyond the end of the tube.

BRIEF DESCRIPTION OF THE DRAWINGS

FIG. 4 is an enlarged sectional view on the line 4—4, FIG. 6.

FIG. 5 is a sectional view on the line 5—5, FIG. 4.

FIG. 6 is a sectional view on the line 6—6, FIG. 4.

FIG. 7 is a sectional view on the line 7—7, FIG. 9.

FIG. 8 is a sectional view on the line 8—8, FIG. 7.

FIG. 9 is a sectional view on the line 9—9, FIG. 7.

FIG. 10 is an exploded perspective view showing assembly of the insulator support shown in FIGS. 4, 5 and 6, on the tube.

FIG. 11 is a fragmentary longitudinal section through another embodiment of the present invention.

FIG. 12 is a transverse sectional view through yet another embodiment of the present invention.

DETAILED DESCRIPTION

Figure 1:
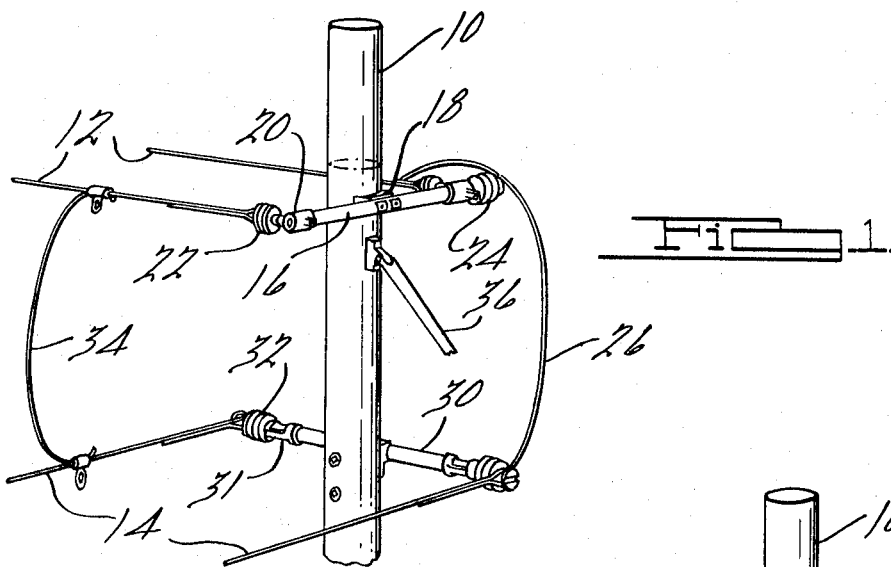
FIG. 1 is a fragmentary perspective view showing one manner of connecting deadend support structures.

Referring first to FIG. 1 there is shown a deadend support construction at a pole 10 for providing an abrupt change of direction between a first pair of electrical transmission lines 12—12, and a second pair of transmission lines 14—14 extending in a direction at right angles to the direction of the lines 12—12. For this purpose a first deadend construction is provided comprising a strong rigid tube 16 rigidly attached to the pole 10 by a gain 18. At its ends the tube 16 is provided with metal insulator supports 20, details of which will subsequently be described but which are illustrated in the figure as supporting insulators 22 extending laterally from the tube, to which the first pair of lines 12 are rigidly attached in such a way that relatively large forces attributable to tension in the lines 12 can be sustained.

The upper tube 16 is further provided with an insulator 24 at one end, the insulator having a groove at one end for receiving a jumper connection or tap 26 which connects one of the lines 12 to one of the lines 14.

The same pole 10 is provided with a second deadend structure comprising a tube 30 having at its ends insulator supports 31 on which are mounted longitudinally extending insulators 32. In this case the insulators 32 are subjected to less strain than the insulators 22 and accordingly, as will subsequently appear, need not be of as heavy construction. In addition to the jumper or tap 26 connecting one line 12 with a line 14, a second jumper or tap 34 is provided connecting the other line 12 with the remaining line 14.

Since the construction illustrated in this figure constitutes a corner or abrupt change in direction in the transmission line, it will be normal to support the pole 10 by a suitable diagonally extending brace indicated at 36.

Figure 2:
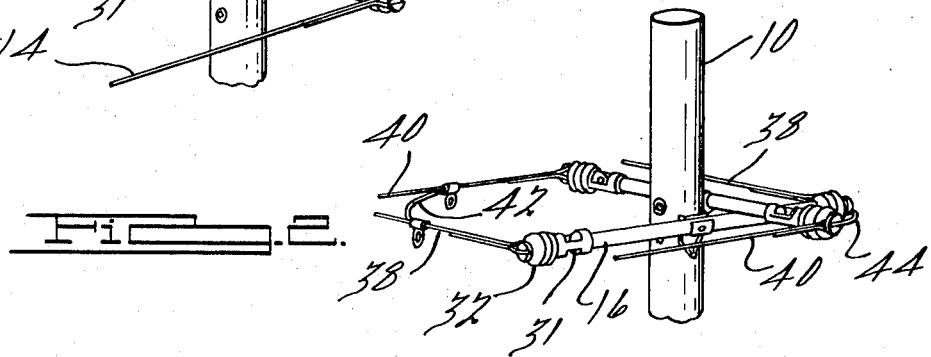
FIG. 2 is a view similar to FIG. 1 illustrating yet another manner of employing the deadend support structure.

Referring now to FIG. 2 there is shown a similar construction in which like elements are given like reference characters. In this case, both of the tubes 16 are provided at their ends with insulator supports 31 mounting insulators 32. In this case lines 38 are connected to lines 40 by jumpers or taps 42 and 44.

Figure 3:
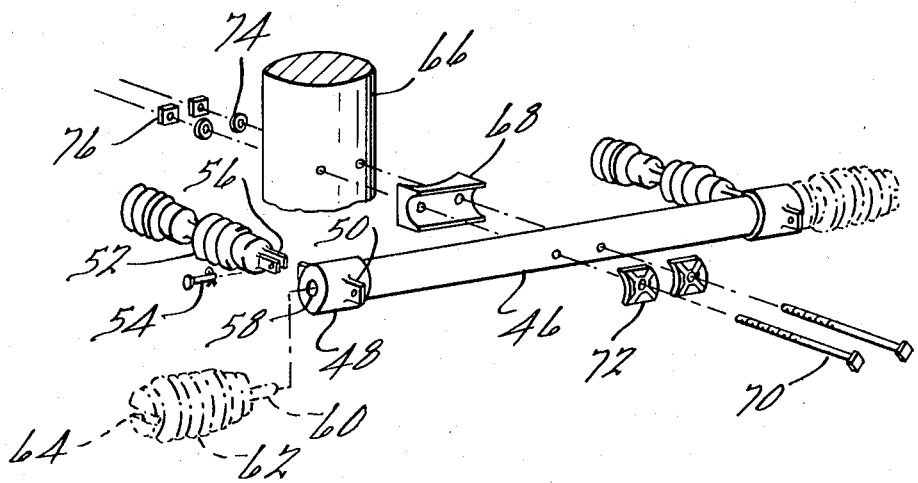
FIG. 3 is an exploded view showing details of connection between a deadend support structure and different types of insulators.

Referring now to FIG. 3 the detailed construction of a deadend structure is shown in exploded form. In this figure the tube 46 is provided at its ends with metal insulator supports 48, details of which will subsequently be described. At this time however, it is sufficient to note that the supports include laterally extending ears 50 to which an elongated insulator 52 is supported by means of a pin 54 extending through aligned openings in a bifurcated end projection 56 on the insulator and in the ear 50. In addition, the insulator support 48 is provided with a tapped hole 58 at its end which receives the threaded end 60 of a mounting stud for the insulator 62. The insulator 62 is provided with a transverse groove 64 at one end for receiving a tap 26 in the relationship illustrated in FIG. 1.

The construction at the opposite end of the deadend structure is identical to that previously described and the description will not be repeated.

The tube 46 is attached to the pole 66 by means of a gain 68 and attaching screws 70, washers 72 and 74, and nuts 76.

Referring now to FIGS. 4–6 the detailed construction of the deadend structure will be described.

In the first place, it comprises essentially a tube which in these figures is designated 80. Detailed construction of this tube forms no part of the present invention. As a matter of fact, a tube entirely satisfactory for the purpose of the present invention is manufactured by the Plastigage Corporation and is fully disclosed in their U.S. Pat. No. 3,574,104 issued Apr. 6, 1971. For purposes of completeness herein however, it is noted that this tube is formed essentially of a hard resin, strongly reinforced with fibrous material such for example as fiberglass. This tube is of course insulating and exhibits great properties of strength and rigidity.

In order to obtain the full benefit of the advantageous physical properties of this tube, the present invention is concerned primarily with the combination which results from the employment of specifically designed insulator supports as will now appear.

It will be appreciated that the end portion of each tube 80 includes interior cylindrical surfaces 82 and exterior cylindrical surfaces 84. The insulator support 85, which is conveniently formed of metal, as best illustrated in FIGS. 4–6, is provided with an interior cylindrical surface 86 which substantially interfits with the exterior cylindrical surface 84 of the tube. While the interior cylindrical surface of the support is said to interfit substantially with the tube end, sufficient clearance is provided to permit adhesive attachment of the support to the tube. The clearance necessary for this is exaggerated in the figures of the drawings, but should be sufficient to insure the presence of adhesive throughout the zone in which the cylindrical surfaces of the support and tube interfit. Conveniently, the adhesive employed for this purpose may be a suitable epoxy resin, in which case the strength of the adhesive bond is comparable to the strength of the components united thereby. A clearance such as to provide an adhesive layer of between one sixty-fourth and three thirty-seconds of an inch is typical.

The end of the insulator support 85 is provided with a transverse wall 88 at the inner side of which is a projection 90 dimensioned to interfit closely with the interior surface 82 of the tube 80. The projection 90 is apertured and internally threaded as indicated at 92 for the reception of a threaded stud such as illustrated at 60 in FIG. 3.

The insulator support is also provided with a pair of laterally extending diametrically oppositely located ears 94 provided with openings 96 for the reception of a pin such as illustrated at 54 in FIG. 3, for attaching laterally extending insulators such as shown at 52 in FIG. 3.

It will be observed that the transverse wall 88 closes the open end of the tube 80 and prevents accumulation of moisture, dirt, etc., therein.

In order to further increase the strength of the connection between the insulator support 85 and the tube 80 beyond that provided by the adhesive bond illustrated at 98, there is provided a transversely extending pin 100 which extends through registering openings provided in the tubular portion of the support and the overlapping end portion of the tube 80. The ends of the pin 100 are riveted or otherwise provided with interlock means as indicated at 102. The pin 100 extends horizontally so that generally horizontal forces applied to the insulator support by a transmission line in tension are absorbed by the pin while minimizing transmission of the stress to the adhesive 98 constituting the bond between the support and tube.

Referring to FIG. 10 there is illustrated in exploded form a different deadend support structure. In this figure the structure comprises the rigid insulating tube 110 provided at each end with insulator supports 112 adapted to support insulators 114 in alignment with the tube 110 and extending longitudinally beyond the ends thereof. The tube 110 is adapted to be mounted on the pole 116 by means of a gain 118, washer 120, screw 122, washers 124, and nuts 126.

The insulator 114 is provided with a longitudinally threaded stud 128 which is adapted to extend through an opening 130 provided in the support 112 and to there receive a nut, not illustrated in this figure.

Details of the construction illustrated in the exploded view of FIG. 10 are shown in FIGS. 7, 8 and 9. In these figures the tube 110 has an exterior cylindrical surface 132 and the insulator support 112 has an internal cylindrical surface 134 adapted to receive the outer end of the tube 110 in substantially interfitting relation but with clearance to provide for the reception of a film or layer 136 of a suitable adhesive such for example as epoxy resin.

The support includes a transversely extending end wall 138 adapted to engage the end of the tube 110 and to constitute a closure therefor. The wall 138 is provided with a short tubular extension 140 dimensioned to interfit closely within the open end of the tube 110.

Insulator support 112 is provided with a second transverse wall 142 spaced from the transverse wall 138 by a pair of arms 144 to provide an open space therebetween to afford access for attachment of a nut to the threaded end of a stud 128 (shown in FIG. 10) extending through a central opening 146 provided in the outer transverse wall 142.

Again, in addition to the attachment provided by the adhesive 136 it is preferable to provide a horizontally extending pin 148 which extends through the overlapped tubular portions of the tube end and the support 112.

It will be observed that the arrangement of parts is such that the space provided between the transverse walls 138 and 142 is open at its top and bottom as best seen in FIGS. 8 and 10. This prevents accumulation of snow, dirt or the like in the opening.

In the embodiments of the invention so far described it will be observed that the end of the tube is received in a tubular cup or socket provided in the insulator support and that in each case the interior of the tube end receives a tubular or cylindrical projection. This provides for adhesive attachment of the elements by providing an excess of the adhesive in fluid form either on the end of the tube or in the cup or socket provided on the support. Thereafter, as the tube is inserted into the cup or socket, the excess adhesive is substantially prevented from flowing into the interior of the tube and will normally back-flow as suggested in the figures.

Referring now to FIG. 11 there is illustrated a somewhat different embodiment of the present invention. In this case the insulator support is indicated at 150 and so far as its attachment to the insulator is concerned, may either be of the type provided with the transverse end plate or wall such as indicated at 142 in FIG. 9, or the type provided with the transverse ears 94 as illustrated in FIG. 5, or both. The essential difference in this embodiment of the invention is that the insulator support in this instance is provided with a relatively long tubular extension 152 designed to extend within the open end of the tube 154 and to be permanently attached therein by an adhesive bond indicated at 156. In addition the interconnection between the tube and support may be strengthened by a pin 158 which in all respects is similar to the pins 148 and 100 previously described.

The support 150 is provided with a transverse wall 160 from which the tubular extension 152 projects, the wall 160 constituting a closure for the end of the tube 154. In addition, the illustrated construction includes an annular abutment surface 162 on the support against which the flat end surface of the tube 154 abuts.

Referring now to FIG. 12 there is illustrated yet another embodiment of the present invention in which the tube 164 has insulated support structure indicated generally at 166 attached thereto. The insulator support structure comprises a pair of plates having flat abutting laterally extending edge portions 168 and cylindrically curved intermediate portions 170. The plates are abutted in the relationship shown to firmly engage the outer surface at the end of the tube 164, and are clamped in this position by clamping means indicated generally at 172. If desired, adhesive may be provided intermediate the cylindrically formed surfaces of the tube end and plates. As shown in FIG. 12, the plates are provided with matching apertures 174 which adapt the insulator support conveniently for attachment to laterally extending insulators of the type shown at 52 in FIG. 3. Alternatively of course, the plates which are clampingly engaged on the end of the tube may be appropriately shaped so as to provide either a plain opening or a threaded opening on the axis of the tube so as to mount insulators thereon in the manner illustrated for the insulator 114 in FIG. 10.

It will be understood that while the tube illustrated in the several embodiments of the invention is formed of a suitable hard strong wearing and abrasion resistant resin and is reinforced by fibers, preferably glass fibers so as to make an exceedingly strong structure, nevertheless it is most desirable to provide for reinforcement of the ends of the tubes by the associated and cooperating structure of the insulating supports. In all cases the tube has at each end both internal and external concentric cylindrical surfaces. In each case the insulator support is provided with at least one cylindrical surface which is adapted to interfit or substantially interfit with one of the cylindrical surfaces at the end of the tube in a manner to reinforce the tube and to prevent the application of localized forces thereto which would tend in time to cause instability or weakness in the attachment of the insulator to the deadend support structure.

In the embodiments of the invention illustrated in all figures with the exception of FIGS. 11 and 12, the insulator support includes both internal and external cylindrical surfaces adapted to interfit or to substantially interfit with two cooperating respectively external and internal cylindrical surfaces on the tube ends.

The combination of the hollow cylindrical tube and the specially designed insulator supports not only provides means for interconnecting insulators to the tube, but also provides for reinforcement and overall strengthening of the tube for its intended purpose.

In order that the reinforcement of the fiberglass tube by the metal insulator support shall be most effective it is desirable that the axial length of the interfitted or substantially interfitted cylindrical surfaces on the tube and support shall be at least substantially equal to the external diameter of the tube.

What we claim as our invention is:

1. A deadend insulator supporting structure comprising an elongated tube formed of rigid insulating material having at an open end thereof interior and exterior concentric cylindrical surfaces, mounting means for mounting said tube generally horizontally to a pole to extend laterally therefrom, an insulator support fixed to said end of said tube and having a cylindrical surface shaped substantially to interfit with one of the cylindrical surfaces of said tube, means interlocking said support and tube, and means on said support for rigid engagement with a line insulator arranged to apply a substantially horizontal loading to said support, in which the means interlocking said support and tube comprises adhesive means interposed between the substantially interfitting cylindrical surfaces thereof, and additionally comprises a pin extending transversely diametrically across the portions of said tube and support having said substantially interfitting cylindrical surfaces, said pin extending substantially horizontally to directly resist the loading applied to said support and to resist movement of said support on said tube.

2. Structure as defined in claim 1 in which the means on said support for rigid engagement with the line insulator comprises an apertured ear extending laterally from a side of said support.

3. A deadend insulator supporting structure comprising an elongated tube formed of rigid insulating material having at an open end thereof interior and exterior concentric cylindrical surfaces, an insulator support fixed to said end of said tube and having a cylindrical surface shaped substantially to interfit with one of the cylindrical surfaces of said tube, means interlocking said support and tube, and means on said support for rigid engagement with a line insulator comprising a flat apertured mounting plate extending transversely to the axis of said tube, and spaced from the said end of said tube, and spaced arms connecting said plate to the portion of said support connected to said tube defining an access opening to provide access to a fastener extending through the aperture in said plate.

4. A deadend insulating supporting structure comprising an elongated tube formed of rigid insulator material having at an open end thereof interior and exterior concentric cylindrical surfaces, an insulator support fixed to one end of said tube and having a cylindrical surface shaped substantially to interfit with one of the cylindrical surfaces of said tube, means interlocking said support and tube, and means on said support for rigid engagement with a line insulator, in which the means for interlocking said support and tube comprises adhesive means interposed between the substantially interfitting cylindrical surfaces thereof, and additionally comprises a pin extending transversely diametrically across the portions of said tube and support having said substantially interfitting cylindrical surfaces, in which the cylindrical surface on said insulator support is an interior cylindrical surface substantially interfitting with the exterior cylindrical surface at the said end of said tube, said insulator support including a transversely extending closure portion shaped to close the said open end of said tube, said closure portion comprising a cylindrical axially extending portion extending into and substantially interfitting with the cylindrical surface at the interior of said tube, said axially extending portion having an axial dimension substantially less than that of the insulator support portion having the interior cylindrical surface, said insulator support having a laterally extending apertured ear which constitutes the means for rigid engagement with the insulator.

5. A deadend insulating supporting structure comprising an elongated tube formed of rigid insulator material having at an open end thereof interior and exterior concentric cylindrical surfaces, an insulator support fixed to said end of said tube and having a cylindrical surface shaped substantially to interfit with one of the cylindrical surfaces of said tube, means interlocking said support and tube, and means on said support for rigid engagement with a line insulator, in which the means for interlocking said support and tube comprises adhesive means interposed between the substantially interfitting cylindrical surfaces thereof, and additionally comprises a pin extending transversely diametrically across the portions of said tube and support having said substantially interfitting cylindrical surfaces, in which the cylindrical surface on said insulator support is an interior cylindrical surface substantially interfitting with the exterior cylindrical surface at the said end of said tube, said insulator support including a transversely extending closure portion shaped to close the said open end of said tube, said closure portion comprising a cylindrical axially extending portion extending into and substantially interfitting with the cylindrical surface at the interior of said tube, said axially extending portion having an axial dimension substantially less than that of the insulator support portion having the interior cylindrical surface, the axially extending portion of the insulator support which extends into the interior of said tube being internally threaded to receive an insulator attaching bolt, said support having a laterally extending apertured ear, said internally threaded extending portion of said support and said ear constituting said means for rigid engagement with a line insulator.

6. A deadend insulator support structure comprising an elongated open ended tube of rigid insulating material, means for attaching said tube at the side of a pole to extend horizontally laterally therefrom, a metal insulator support attached to one end of said tube and adapted to be subjected to substantially horizontal loading from a line insulator in a direction substantially perpendicular to the axis of said tube, said support having a relatively short cylindrical projection shaped to interfit within the open end of said tube and a relatively longer tubular extension shaped to interfit over the open end of said tube, means on said support for connecting a line insulator thereto to apply generally horizontal loading to said support, and a reinforcing pin extending through the tubular extension of said insulator support and the end portion of said tube on which said tubular extension is received.

7. Structure as defined in claim 6 in which said pin occupies a horizontal plane.

8. Structure as defined in claim 7 in which the tubular extension of said insulator support is adhesively bonded to the exterior end surface of said tube.

* * * * *

UNITED STATES PATENT OFFICE
CERTIFICATE OF CORRECTION

Patent No. 3,715,460            Dated     February 6, 1973

Inventor(s) Ernest A. Elliott, et al.

It is certified that error appears in the above-identified patent and that said Letters Patent are hereby corrected as shown below:

In the grant (only) Columns 3 and 4 should read as shown on the attached copy.

Signed and sealed this 27th day of November 1973.

(SEAL)
Attest:

EDWARD M. FLETCHER, JR.          RENE D. TEGTMEYER
Attesting Officer                 Acting Commissioner of Patents